(12) United States Patent
Thiele

(10) Patent No.: US 11,143,253 B2
(45) Date of Patent: Oct. 12, 2021

(54) BRAKE DISC FOR A VEHICLE DISC BRAKE

(71) Applicant: ZF Active Safety GmbH, Koblenz (DE)

(72) Inventor: Jan Thiele, Bonn (DE)

(73) Assignee: ZF Active Safety GmbH, Koblenz (DE)

( * ) Notice: Subject to any disclaimer, the term of this patent is extended or adjusted under 35 U.S.C. 154(b) by 63 days.

(21) Appl. No.: 16/688,520

(22) Filed: Nov. 19, 2019

(65) Prior Publication Data

US 2020/0166093 A1 May 28, 2020

(30) Foreign Application Priority Data

Nov. 22, 2018 (DE) .......................... 102018009194.6

(51) Int. Cl.
| | |
|---|---|
| *F16D 65/12* | (2006.01) |
| *F16D 65/095* | (2006.01) |
| *F16D 65/00* | (2006.01) |
| *F16D 55/02* | (2006.01) |
| *B60T 1/06* | (2006.01) |
| *F16D 65/02* | (2006.01) |

(52) U.S. Cl.
CPC ............ *F16D 65/095* (2013.01); *B60T 1/065* (2013.01); *F16D 55/02* (2013.01); *F16D 65/0006* (2013.01); *F16D 65/123* (2013.01); *F16D 2065/134* (2013.01); *F16D 2065/1316* (2013.01); *F16D 2065/1376* (2013.01); *F16D 2065/1384* (2013.01)

(58) Field of Classification Search
CPC ........... F16D 65/123; F16D 2065/1316; F16D 2065/134; F16D 2065/1376; F16D 2065/1384
See application file for complete search history.

(56) References Cited

U.S. PATENT DOCUMENTS

| | | | |
|---|---|---|---|
| 2019/0203784 A1 | 7/2019 | Giese et al. | |
| 2020/0208694 A1* | 7/2020 | Bozovic | .................. F16D 65/12 |
| 2021/0010550 A1* | 1/2021 | Raab | ..................... F16D 65/123 |

FOREIGN PATENT DOCUMENTS

| | | | | |
|---|---|---|---|---|
| DE | 2013535 A1 | 10/1970 | | |
| DE | 1625742 B2 | 6/1975 | | |
| DE | 2806014 A1 | 8/1979 | | |
| DE | 10006394 A1 | 8/2001 | | |
| DE | 10125114 A1 | 12/2002 | | |
| DE | 10217616 A1 | 11/2003 | | |
| DE | 102017210451 A1 * | 10/2018 | ........... F16D 65/123 |
| GB | 2307960 A | 6/1997 | | |
| WO | 2018036742 A1 | 3/2018 | | |

* cited by examiner

*Primary Examiner* — Nicholas J Lane
(74) *Attorney, Agent, or Firm* — Robert James Harwood

(57) ABSTRACT

The present disclosure relates to a brake disc for a vehicle disc brake. The brake disc has a brake disc body, with a friction ring on which friction surfaces are formed, and a brake disc pot that is designed for fastening the brake disc to a vehicle axle. The brake disc pot is connected to the brake disc body in a connecting area via at least one connecting element, and at least one reinforcing ring in the connecting area is mounted on the brake disc in a force-fit manner.

10 Claims, 3 Drawing Sheets

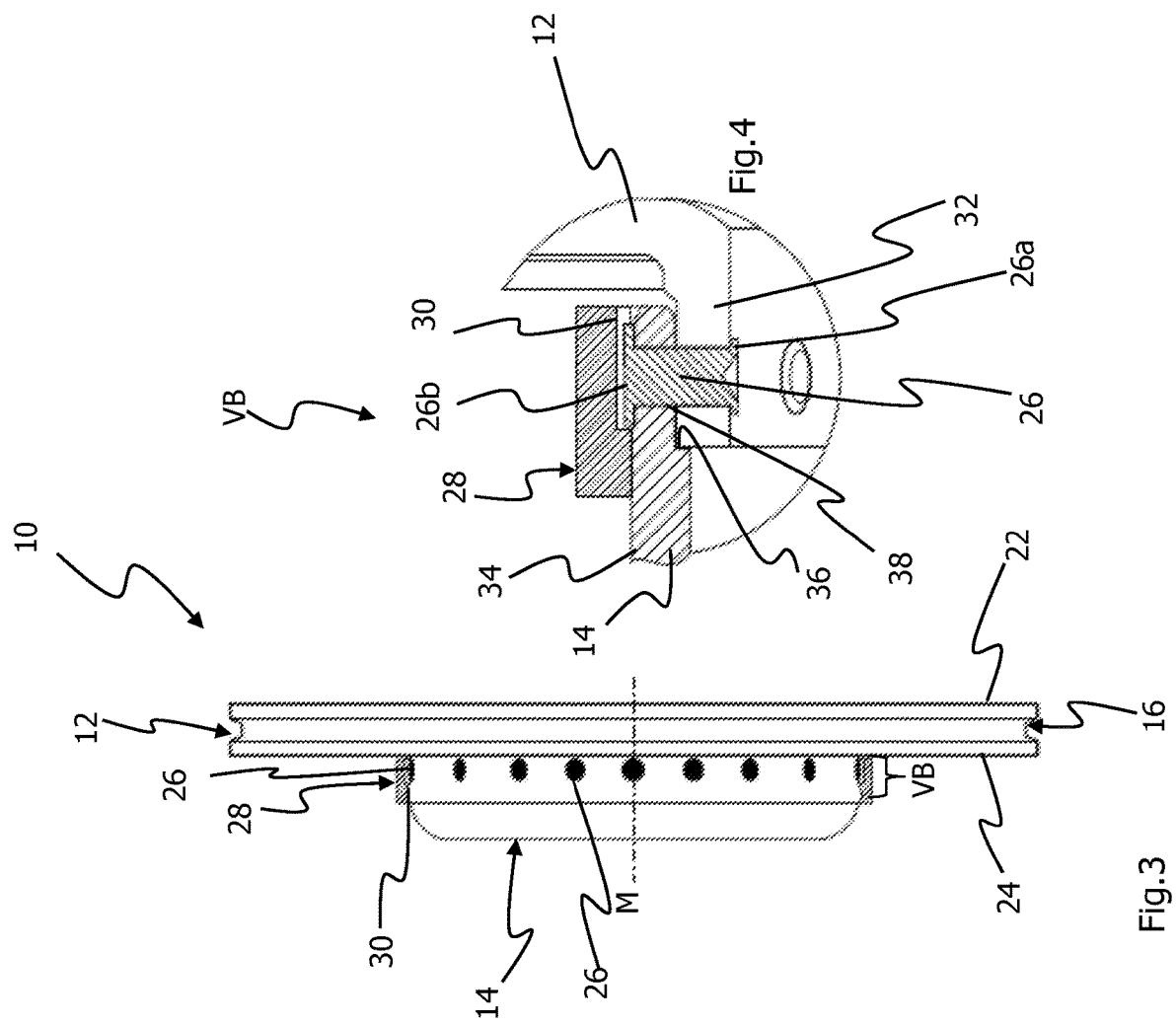

BRAKE DISC FOR A VEHICLE DISC BRAKE

CROSS-REFERENCE TO RELATED APPLICATION

This application claims priority to [German or UK] Patent Application No. 102018009194.6, filed Nov. 22, 2018, the disclosure of which is incorporated herein by reference in its entirety.

TECHNICAL FIELD

The present disclosure relates to a brake disc for a vehicle disc brake. The present disclosure further relates to a vehicle brake having at least one such a brake disc.

BACKGROUND

Brake discs for vehicle disc brakes are known from the prior art. The published German Patent application DE 101 25 114 A1 discloses a brake disc having a damping element. The damping element is disposed on a friction ring of the brake disc. WO 2018/036742 A1 discloses a brake disc having a friction ring and a brake disc pot, with a damping element mounted on an inner circumferential surface or an outer circumferential surface of the brake disc pot.

SUMMARY

The task of the present disclosure is to provide a brake disc that is easily and cost-effectively manufacturable, and via which undesirable noise levels be reduced. The brake disc according to the disclosure has a brake disc body with a friction ring on which friction surfaces are formed, and a brake disc pot that is designed for fastening the brake disc to a vehicle axle. The brake disc pot is connected to the brake disc body in a connecting area via at least one connecting element. In addition, the brake disc includes at least one reinforcing ring which in the connecting area is mounted on the brake disc in a force-fit manner.

Friction force fluctuations during a braking operation may result in audible, in particular high-frequency, noise due to vibrations of the brake disc. Such undesirable noise results primarily from radial and tangential vibration modes at the inner area of the friction ring. By means of the at least one reinforcing ring, the natural frequencies and vibration modes of the brake disc may be changed in such a way that the described noise may be reduced. More precisely, by means of the at least one reinforcing ring, the rigidity of the basic structure of the brake disc may be modified in such a way that a shift of the natural frequency and of the vibration modes of the brake disc may be achieved.

The damping properties may be improved via the additional material of the at least one reinforcing ring in the connecting area between the brake disc pot and the brake disc body. The basic structure of the brake disc does not have to be changed in order to mount the at least one reinforcing ring. By mounting the at least one reinforcing ring, the brake disc is altered in such a way that a uniform outer surface is formed on the brake disc pot. In addition, the forms of vibration of the brake disc may thus be influenced. By adapting the size of the at least one reinforcing ring, it is also easily possible to match the brake disc to various types of vehicles and their various forms of vibration. With the at least one reinforcing ring, a force may be generated that damps the excessive increases in amplitude of the vibration modes. During operation of the disc brake, the at least one reinforcing ring may exert a force on the connecting area between the brake disc pot and the brake disc body, via which the excessive increases in amplitude may be damped. The at least one reinforcing ring provides a higher damping at the brake disc, resulting in a reduction in the noise that occurs. The original state of the brake disc may be restored by removing the at least one reinforcing ring.

The at least one reinforcing ring may be mounted in a force-fit manner on an outer circumferential surface of the brake disc pot. The at least one reinforcing ring may have a uniform outer circumferential surface, as the result of which a uniform outer surface may be formed in the connecting area between the brake disc body and the brake disc pot. The at least one reinforcing ring may have at least one receptacle. The at least one receptacle may be designed for accommodating the at least one connecting element in sections. The at least one receptacle may preferably be designed to accommodate a head of the at least one connecting element. The at least one receptacle may be formed on an inner circumferential surface of the at least one reinforcing ring. The at least one receptacle may extend for a predetermined axial distance into the at least one reinforcing ring. The at least one receptacle may extend into the at least one reinforcing ring from an end face of the at least one reinforcing ring. The at least one receptacle may extend over a predetermined section in the axial direction, along the axial extension of the at least one reinforcing ring.

Multiple receptacles may be formed on the at least one reinforcing ring. The receptacles may be formed on the at least one reinforcing ring, preferably on the inner circumferential surface of the reinforcing ring, with an offset relative to one another at predetermined, in particular uniform, angular intervals.

The brake disc body may have a tubular section. The tubular section may be radially formed within the friction ring, on the brake disc body. The at least one tubular section may have a predetermined axial extension. The brake disc pot may enclose the tubular section of the brake disc body and may be connected thereto in a force-fit manner. The at least one connecting element may extend in the connecting area in the radial direction.

The at least one connecting element may extend through the tubular section of the brake disc body and the brake disc pot in the radial direction. The at least one connecting element may be for example a rivet or a bolt. The at least one reinforcing ring on its inner side may accommodate a head of the at least one connecting element, and on its outer side may form a uniform outer surface in the connecting area. The connecting area may include at least one section in which the brake disc body and the brake disc pot overlap. The brake disc body and the brake disc pot may in particular overlap in the axial direction. The overlap may extend, for example, over a predetermined section of the axial extension of the tubular section of the brake disc body.

The at least one reinforcing ring may have a smooth outer circumferential surface. The connecting elements used to connect the brake disc body and the brake disc pot may be covered by the at least one reinforcing ring, so that a smooth cylindrical outer circumferential surface is provided in the connecting area by means of the at least one reinforcing ring. The brake disc pot may have a cylindrical outer circumferential surface and a cylindrical inner circumferential surface. The tubular section of the at least one brake disc body may likewise have a cylindrical inner circumferential surface and a cylindrical outer circumferential surface.

The at least one reinforcing ring may be pressed onto the brake disc pot in the connecting area. The force-fit connection between the reinforcing ring and the brake disc pot may be formed in this way. The inner diameter of the at least one reinforcing ring may be somewhat smaller than the outer diameter of the brake disc pot. Radially protruding heads of the connecting elements may be covered by the at least one reinforcing ring. A continuous or uniform outer surface may thus be formed in the connecting area. The connecting elements are used to secure the connection between the brake disc body and the brake disc pot in the event that the frictional or force fit is not sufficient during operation of the brake disc.

The present disclosure further relates to a vehicle brake having at least one brake disc of the type described above.

BRIEF DESCRIPTION OF THE DRAWINGS

Further advantages and features of the present disclosure will become apparent from the following description and the accompanying drawings, to which reference is made. In which are shown:

FIG. 3 shows a side view of a brake disc according to the disclosure together with a reinforcing ring;

FIG. 4 shows an enlarged partial sectional view of the connecting area between the brake disc body and the brake disc pot.

DETAILED DESCRIPTION

Figure 1:
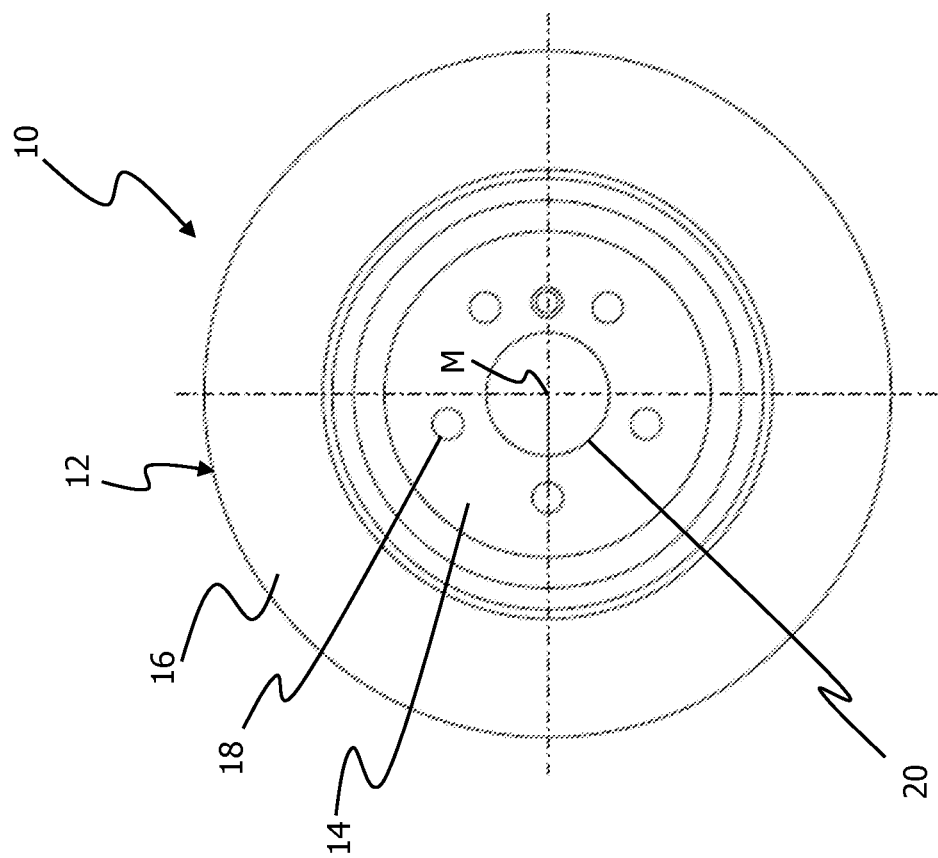
FIG. 1 shows a top view of a disc brake.

FIG. 1 shows a top view of a brake disc 10. The brake disc 10 has a brake disc body 12, and a brake disc pot 14 that is designed for fastening the brake disc 10 to a vehicle axle. The brake disc body 12 and the brake disc pot are disposed concentrically with respect to a center axis M of the brake disc 10. The brake disc body 12 has a friction ring 16. The brake disc pot 14 is mounted on the brake disc body 12, radially within the friction ring 16. The brake disc pot 14 has multiple openings 18 and a central opening 20. The central opening 20 is designed for accommodating a section of a vehicle axle, not shown. The openings 18 are used to fasten the brake disc 10 to the vehicle axle.

Figure 2:
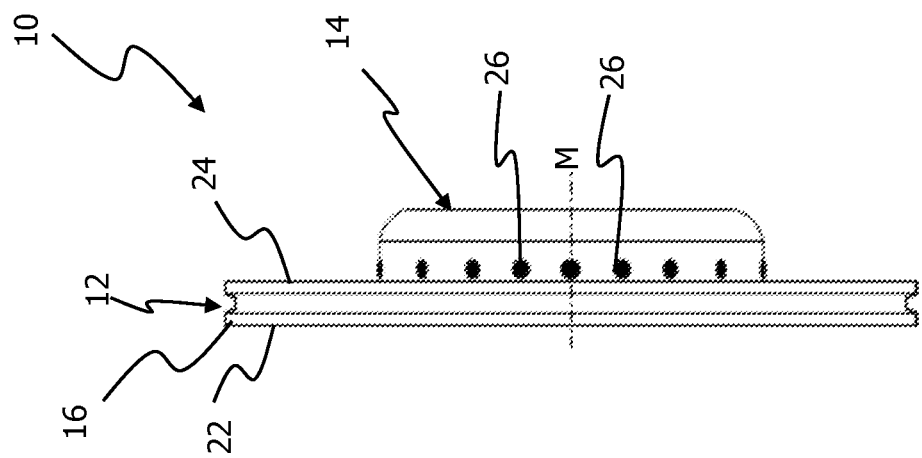
FIG. 2 shows a side view of the brake disc in FIG. 1.

FIG. 2 shows a side view of the brake disc 10. Friction surfaces 22 and 24 are formed on the opposite side faces of the friction ring 16. The brake disc pot 14 is disposed radially within the friction ring 16 and is connected to the brake disc body 12. Connecting elements 26, the heads of which are apparent in FIG. 2, are used to connect the brake disc body 12 and the brake disc pot 14. The connecting elements 26 extend through a tubular section 32 (see FIG. 4) of the brake disc body 12 and the brake disc pot 14 in the radial direction.

FIG. 3 shows a side view of the brake disc 10, in which a reinforcing ring 28 is illustrated in cross section. The brake disc body 12 and the brake disc pot 14 are connected to one another in a connecting area VB. The reinforcing ring 28 is disposed in the connecting area VB and encloses the connecting area VB. The reinforcing ring 28 covers the connecting elements 26 here. The reinforcing ring 28 has multiple receptacles 30 in which a connecting element 26 or the head thereof is accommodated in each case. The reinforcing ring 28 is connected to the brake disc pot 14 in a force-fit manner, for example by pressing onto the brake disc pot 14. The reinforcing ring 28 extends radially outwardly around the brake disc pot 14.

FIG. 4 shows an enlarged partial sectional view of the connecting area VB.

The reinforcing ring 28 may be made of metal. The brake disc body 12 is provided with the tubular section 32, which extends in the axial direction. The brake disc pot 14 has a cylindrical wall which extends in the axial direction, and which in the cross-sectional view according to FIG. 4 is illustrated by a section 34 that extends in the axial direction. A portion of the axial section 34 outwardly encloses the tubular section 32 of the brake disc body 12.

The tubular section 32 and the cylindrical section 34 of the brake disc pot 14 thus overlap in the connecting area VB in the axial direction. The tubular section 32 and the cylindrical section 34 are connected to one another by means of the connecting elements 26. The connecting elements 26 extend here through the tubular section 32 and the axial section 34 in the radial direction. A step 36 or a shoulder on which the end face of the tubular section 32 may rest is formed on the inner side of the axial section 34. A stop is thus formed, which when reached indicates that the brake disc pot 14 is correctly positioned on the tubular section 32 of the brake disc body 12.

The connecting elements 26 on their radially inner ends in each case have a head 26a, and on their radially outer ends in each case have a head 26b. The head 26b of the connecting elements 26 is accommodated in the associated receptacle 30 of the reinforcing ring 28. The connecting elements 26 may be rivets or bolts that extend through radial openings 38 in the tubular section 32 and the axial section 34 of the brake disc body 12.

The reinforcing ring 28 has a cylindrical outer circumferential surface. A uniform, smooth outer surface of the brake disc 10 may be formed in the connecting area VB by means of the reinforcing ring 28. The receptacles 30 do not extend completely through the reinforcing ring 28 in the axial direction. In other words, the axial extension of the receptacles 30 is smaller than the axial extension of the reinforcing ring 28, so that a section of a cylindrical inner circumferential surface 40 of the reinforcing ring 28 still remains in the area of the receptacles 30. The receptacles 30 extend over a predetermined section of the axial extension of the reinforcing ring 28. The receptacles 30, as illustrated, extend axially in the reinforcing ring 28 from an end face thereof.

Figure 5:
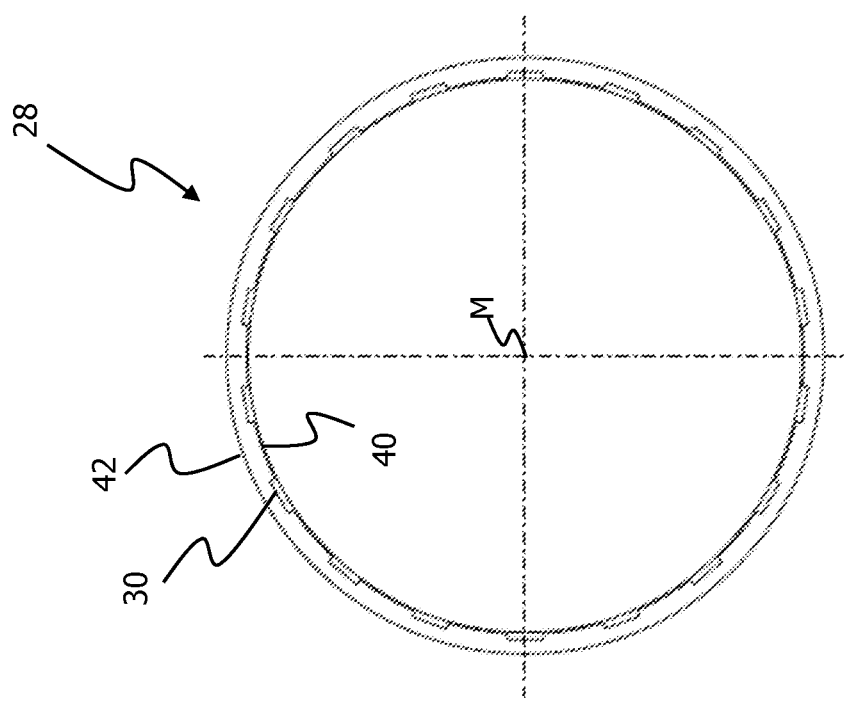
FIG. 5 shows a view of a reinforcing ring.

FIG. 5 shows a view of the reinforcing ring 28, in which the receptacles 30 at the inner circumferential surface 40 of the reinforcing ring 28 are apparent. The reinforcing ring 28 has a cylindrical outer circumferential surface 42 that is uniform and smooth. The vibration modes of the brake disc 10 may be influenced in this way. The receptacles 30 are formed on the reinforcing ring 28, offset relative to one another about the center axis M in the circumferential direction, at predetermined, in the present case equal, angular intervals, and in each case have a predetermined axial extension that does not extend completely through the reinforcing ring 28. The receptacles 30 are designed for accommodating in each case a head (see FIG. 4) of the fastening elements.

What is claimed is:

1. A brake disc for a vehicle disc brake, comprising:
   a brake disc body having a friction ring with friction surfaces,
   a brake disc pot that is designed for fastening the brake disc to a vehicle axle, wherein the brake disc pot is connected to the brake disc body in a connecting area via at least one connecting element, and at least one reinforcing ring which in the connecting area is mounted on the brake disc in a force-fit manner such that the at least one reinforcing ring covers an outward facing surface of the at least one connecting element in a radial direction of the brake disc body.

2. The brake disc according to claim 1, wherein the at least one reinforcing ring is mounted in a force-fit manner on an outer circumferential surface of the brake disc pot.

3. The brake disc according to claim 1, wherein the at least one reinforcing ring has at least one receptacle that is designed for accommodating a section of the at least one connecting element.

4. The brake disc according to claim 3, wherein the at least one receptacle extends into the at least one reinforcing ring with a predetermined axial extension.

5. The brake disc according to claim 3, wherein the reinforcing ring has multiple receptacles that are formed on the reinforcing ring with an offset relative to one another at predetermined angular intervals.

6. The brake disc according to claim 1, wherein the brake disc pot encloses a tubular section of the brake disc body.

7. The brake disc according to claim 1, wherein the at least one connecting element extends in the connecting area in the radial direction.

8. The brake disc according to claim 7, wherein the connecting area includes at least one section having a radially extending shoulder in which the brake disc body and the brake disc pot overlap.

9. The brake disc according to claim 1, wherein the at least one reinforcing ring is pressed onto the brake disc pot in the connecting area.

10. The brake disc according to claim 3, wherein the at least one receptacle comprises a blind hole.

* * * * *